United States Patent [19]
Yamamoto

[11] Patent Number: 6,045,304
[45] Date of Patent: Apr. 4, 2000

[54] HIGH-SPEED GUN DRILL

[75] Inventor: Yoshihiko Yamamoto, Suzuka, Japan

[73] Assignee: Honda Giken Kogyo Kabushiki Kaisha, Tokyo, Japan

[21] Appl. No.: 09/234,447

[22] Filed: Jan. 21, 1999

[30] Foreign Application Priority Data

Jan. 22, 1998 [JP] Japan .................................. 10-025147

[51] Int. Cl.$^7$ .................................................. B32B 51/00
[52] U.S. Cl. ........................... 408/199; 408/227; 408/705
[58] Field of Search .................................. 408/199, 227, 408/229, 705

[56] References Cited

U.S. PATENT DOCUMENTS

| | | | |
|---|---|---|---|
| 1,513,350 | 10/1924 | Stolle | 408/705 |
| 2,674,908 | 4/1954 | Willingham | 408/705 |
| 2,739,496 | 3/1956 | Fleischer | 408/705 |

FOREIGN PATENT DOCUMENTS

| | | |
|---|---|---|
| 5-24247 | 3/1993 | Japan . |
| 6-33624 | 5/1994 | Japan . |
| 10-128610 | 5/1998 | Japan . |

OTHER PUBLICATIONS

Tool and Manufacturing Engineers Handbook, Fourth Edition, vol. 1, Machining, Thomas J. Drozda, Society of Manufactuing Engineers, 1983, Chapter 9, pp. 54 and 55.

*Primary Examiner*—Daniel W. Howell
*Attorney, Agent, or Firm*—Pollock, Vande Sande & Amernick

[57] ABSTRACT

A gun drill having a reversed taper approximately ten times greater than the conventional drills, or approximately 0.3 mm per 100 mm, between a tip of the cutting edge and a point some distance away therefrom is provided. The gun drills deep holes at high speed and with sufficient exactness by preventing the peripheral surface of the gun drill from coming into contact with the inner surface of the hole being drilled.

1 Claim, 1 Drawing Sheet

HIGH-SPEED GUN DRILL

BACKGROUND OF THE INVENTION

1. Field of the Invention

This invention relates to a high-speed gun drill.

2. Description of the Related Art

Gun drills for drilling deep holes usually have a reversed taper of approximately 0.01 mm per 100 mm from the tip to the base end thereof. The reversed taper is provided to assure smooth drilling by preventing frictional contact between the peripheral surface of the gun drill and the inner surface of the hole being drilled.

When deep holes are drilled by rotating gun drills of this type at high speeds, however, large torques acting on cutting edges of the drills often cause axial runout or flexing. Then, it becomes practically impossible to continue high-speed drilling at a speed of, for example, 1100 mm per minute.

SUMMARY OF THE INVENTION

This invention solves this problem by providing an approximately ten times greater reversed taper to the peripheral surface of the cutting edge of a high-speed gun drill between the tip and base ends thereof than the conventional drills. This provision of a greater reversed taper keeps the peripheral surface of the gun drill out of contact with the inner surface of the hole being drilled even during high-speed operations, thus making it possible to drill deep holes at high speed and with sufficient exactness.

An object of this invention is to provide a new type of high-speed gun drill that can drill deep holes with great accuracy while maintaining high feed speeds.

DETAILED DESCRIPTION OF PREFERRED EMBODIMENTS

Figure 1:
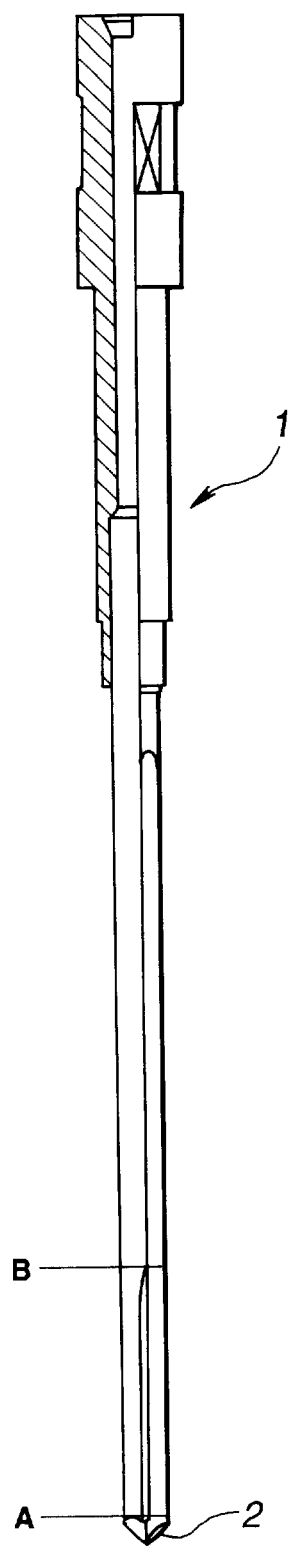
FIG. 1 is a side elevation of a high-speed gun drill embodying the principle of this invention.

In the attached figure, reference numeral 1 designates a gun drill having a two-ply cutting edge 2 at the tip thereof. The gun drill 1 is provided with a reversed taper of 0.28 mm per 100 mm of axial length so that when the outside diameter of the tip A is 8.5 mm that of point B, which is 35 mm away from the tip A, becomes 8.4 mm.

The reversed taper on the peripheral surface of the cutting edges of conventional gun drills is approximately 0.03 to 0.04 mm over a length of 100 mm. By contrast, the reversed taper on the peripheral surface of the cutting edge 2 of the gun drill of this invention is approximately 0.30 mm over the same length. This reversed taper is approximately ten times greater than conventional drills.

Even when a large torque acts on the cutting edge during high-speed drilling and causes axial runout or flexing of the gun drill 1, this reversed taper prevents the peripheral surface of the cutting edge 2 from coming into frictional contact with the inner surface of the hole being drilled. This, in turn, decreases resistance to drilling and assures exact drilling.

An experiment to drill a hole 215 mm deep using drill guns with an outside diameter of 8.5 mm at the tip A was made. A gun drill having a reversed taper of 0.28 mm per 100 mm could drill a hole at a speed of 1100 mm per minute and reduced the time required to drill two holes having a depth of 215 mm each to 40 seconds.

By comparison, a conventional gun drill with a reversed taper of 0.03 mm per 100 mm could drill at a speed of only 700 mm per minute because contact between the peripheral surface of the gun drill and the inner surface of the hole being drilled increased frictional resistance. It took 53 seconds to drill two holes with a depth of 215 mm each.

What is claimed is:

1. In a high-speed gun drill for drilling a deep hole in a workpiece, the improvement comprising an axial reversed taper of approximately 0.3 mm per 100 mm is provided on a peripheral surface of a cutting edge of the gun drill between the tip and base ends thereof.

* * * * *